Jan. 6, 1931.  E. A. DOUB  1,787,857
STARTING GEAR
Filed Sept. 20, 1929
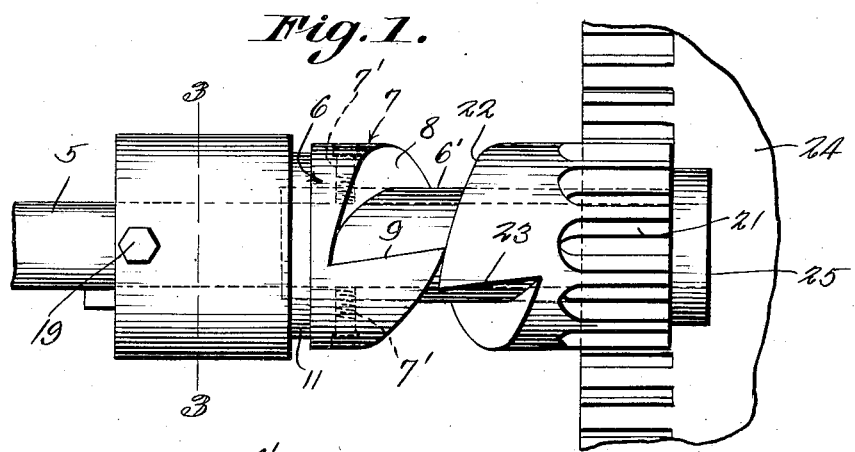
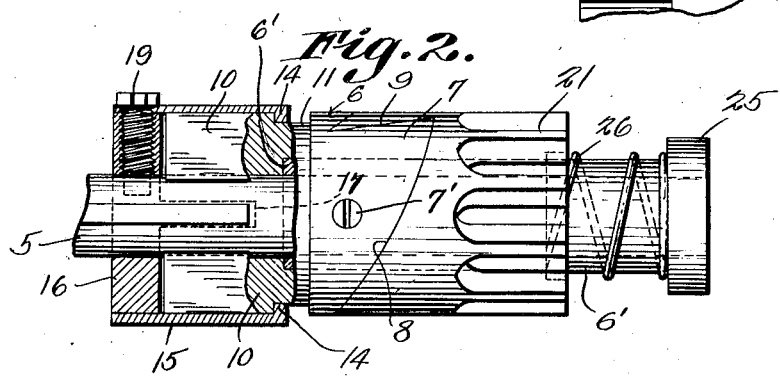
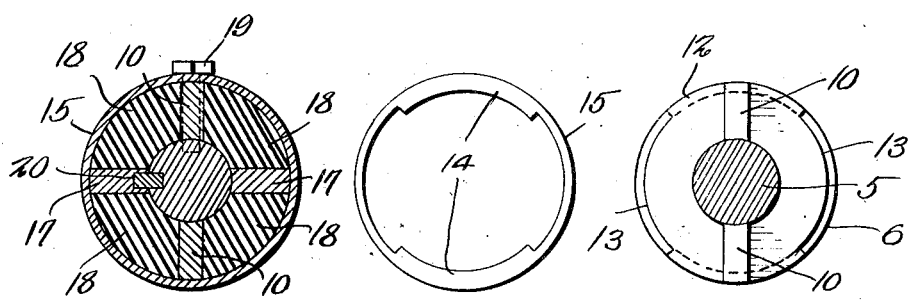
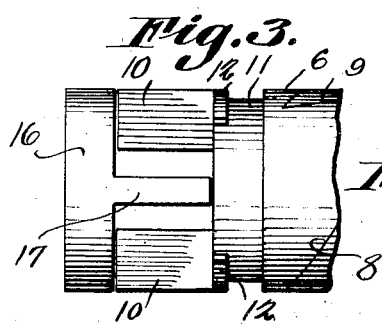
Edwin A. Doub.
Inventor
By C. A. Snow & Co.
Attorneys.

Patented Jan. 6, 1931

1,787,857

UNITED STATES PATENT OFFICE

EDWIN A. DOUB, OF WALNUT, KANSAS, ASSIGNOR OF ONE-HALF TO JAMES R. WILKINS, OF WALNUT, KANSAS

STARTING GEAR     REISSUED

Application filed September 20, 1929. Serial No. 393,999.

This invention relates to starting motors, and more particularly to the construction of the power pinion and means for transmitting movement to the power pinion to rotate the fly wheel of a motor to start the motor.

The primary object of the invention is to provide a device of this character which will insure against the power pinion jamming and locking against the ends of the fly wheel cogs, eliminating any possibility of the fly wheel cogs or teeth being stripped.

A further object of the invention is to provide a device of this character which will cause the power pinion to be thrown rearwardly to its normal or inactive position by the rotation of the fly wheel engaged by the power gear.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view illustrating the shaft of a starting motor equipped with a starting pinion constructed in accordance with the invention and showing the starting pinion in its operative position.

Figure 2 is an elevational view of a starting pinion constructed in accordance with the invention, a portion thereof being shown in section.

Figure 3 is a sectional view taken on line 3—3 of Figure 1.

Figure 4 is an end elevational view of the sleeve forming a part of the device.

Figure 5 is an end elevational view of the inner end of one of the clutch sections.

Figure 6 is an elevational view of one end of the clutch mechanism, the protecting sleeve thereof having been removed.

Referring to the drawing in detail, the reference character 5 designates a starting motor shaft on which the sleeve 6' is mounted, the sleeve providing a support for the clutch section 6, which is secured to the sleeve by means of the screws 7'. The clutch section 6 embodies clutch members 7 that are formed with curved outer surfaces 8 and inclined surfaces 9 connecting the surfaces 8. The clutch section 6 is formed with a bore so that it may be readily fitted over the sleeve 6', and as shown the member 6 is provided with blades 10 that extend longitudinally of the shaft 5 and disposed on opposite sides thereof, the blades being spaced apart sufficiently to allow the inner edges thereof to move over the shaft 5 when the clutch section 6 is in operation.

A groove 11 is provided in the clutch member 6 and defines an annular shoulder 12 which is formed with cut out portions 13 to receive the inwardly extended flanges 14 formed integral with the sleeve 15 at the inner end of the sleeve so that by positioning the sleeve on the member 6, the sleeve may be locked to the member 6 by giving the sleeve a quarter turn bringing the flanges 14 into engagement with shoulder 12.

Positioned in the sleeve 15 is an end member 16 which is provided with inwardly extended blades 17 arranged at opposite sides thereof, the blades 17 being so disposed that they form pockets with the blades 10 for the reception of the rubber cushioning blocks 18 against which the blades move when the starting mechanism is thrown into operation. The sleeve 15 and end member 16 are provided with registering openings to receive the screw 19 connecting the sleeve and end member, the screw 19 being of a length to extend into an opening of the shaft 5, locking the sleeve and end member to the shaft 5.

A key-way 20 is formed in the inner edge of one of the blades 17, so that the sleeve and end member may be keyed to the shaft, lending strength to the assembly.

Thus it will be seen that due to this construction, rotary movement of the starting shaft will be imparted to the clutch section 6 through the blades and cushioning blocks, relieving the starting motor shaft and pinion of undue strain caused by the initial sudden movement of the starting motor shaft.

Slidably mounted on the starting motor shaft 5, is a pinion 21 which is provided with curved clutch faces 22 connected by inclined faces 23, the faces 22 adapted to ride over the curved faces 8 of the clutch section 6, throwing the pinion 21 to the outer end of the shaft 5, causing the teeth of the pinion 21 to mesh with the teeth of the fly wheel 24 of the motor with which the device is used, to impart rotary movement to the fly wheel and motor. After the motor has been started, the rotary movement of the fly wheel 24 will cause the pinion 21 to move in the opposite direction, with the result that the inclined faces 23 engage the inclined surfaces 9, causing the pinion 21 to move inwardly out of mesh with the teeth of the fly wheel 24.

In order that outward movement of the pinion 21 will be restricted, a head 25 is provided at the outer end of the sleeve 6' against which the coiled spring 26 engages, the opposite end of the coiled spring resting against the pinion 21 to exert an inward pressure on the pinion. When the pinion is moved to the limit of its outward movement, the spring is placed under tension to return the pinion to its normal position after the motor has been started, however should the spring break, or lose its tension, the cooperating inclined surfaces of the clutch sections will act to return the pinion.

I claim:

In a device of the class described, a driven shaft, a clutch section having curved outer surfaces, a plurality of blades extending rearwardly from the clutch section, and extending in parallel relation with the driven shaft, a sleeve positioned over one end of the shaft and extending over the blades, an end member secured within the sleeve, blades extending from the end member, rubber cushioning blocks fitted between the blades of the end member and clutch section, means for securing the sleeve in position, and a pinion slidably mounted on the shaft and having curved surfaces to engage the curved surfaces of the clutch section, to move the clutch section outwardly.

In testimony that I claim the foregoing as my own, I have hereto affixed my signature.

EDWIN A. DOUB.